Figures 1, 2:
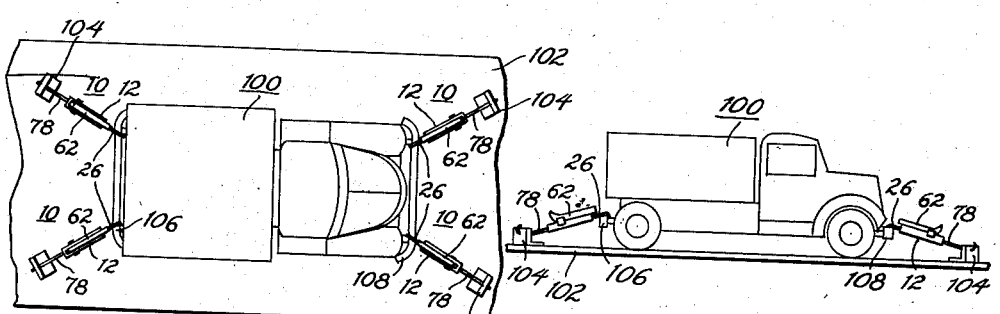

Aug. 12, 1958 W. J. CHULACK ET AL 2,847,207
SECURING DEVICE
Filed Feb. 8, 1955

INVENTORS.
WILLIAM J. CHULACK
LEE I. LUTHER
BY
Jacob Trachtman
ATTORNEY.

United States Patent Office 2,847,207
Patented Aug. 12, 1958

2,847,207

SECURING DEVICE

William J. Chulack, Collingswood, N. J., and
Lee I. Luther, Philadelphia, Pa.

Application February 8, 1955, Serial No. 486,932

17 Claims. (Cl. 267—1)

This invention relates to a securing device, and more particularly to a securing device of the spring actuated type.

Heretofore objects have been secured and positioned for transportation by means of spring loaded cables and turn buckles. The applications of such devices is time consuming, while their removal is wasteful since the cables are usually cut and discarded.

Accordingly, it is the primary object of this invention to provide a new and improved securing device which may be easily and quickly applied and removed.

Another object of this invention is to provide a new and improved securing device which applies a positioning tension to the secured body while allowing a degree of adjustment to prevent its damage.

Still another object of this invention is to provide a new and improved securing device which can adjust the tension applied to the secured body.

A further object of this invention is to provide a new and improved securing device which is easily handled, adjusted and stored.

Still a further object of this invention is to provide a new and improved securing device which is rugged in construction and requires a minimum of service.

Another object of the invention is to provide a new and improved securing device which may be repeatedly reused and is adaptable to various applications.

Yet another object of the invention is to provide a new and improved securing device which is easily constructed and inexpensive to manufacture.

The foregoing objects are attained, as well as many other objects by providing a securing device comprising a frame unit having first and second ends. A retractable and extensible securing element is provided which protrudes through the first end of the frame unit, while a second securing element is removably attached to the second end of the frame unit. A spring compressing plate which is coupled with the retractable securing element is positioned within the frame unit and is movable in the direction between its first and second ends. A contractible coil spring member is received within the frame unit about the retractable securing element and between the compressing plate and the first end of the frame unit. The coil spring member urges the compressing plate toward the second end of the unit and the retractable securing element towards its retracted position.

A cam lever which is pivotally secured with the frame unit controllably contacts the compressing plate causing it to move toward the first end of the frame unit compressing the spring member and extending the retractable securing element. The retractable securing element is thus extended when the device is being applied. The cam lever disengages the compressing plate when the device is active allowing the spring member to exert a tensioning force upon the retractable securing element. Since the securing elements exert a tensioning force they act to secure and position the coupled body.

Figure 3:
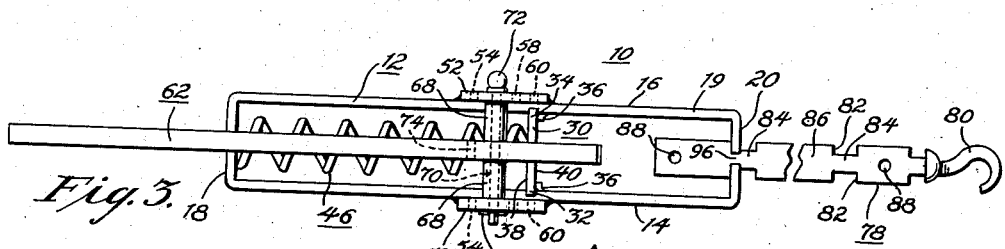
Figure 4:
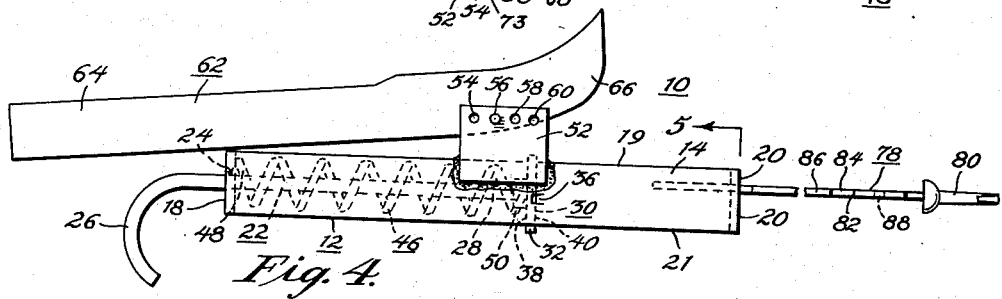
Figure 6:
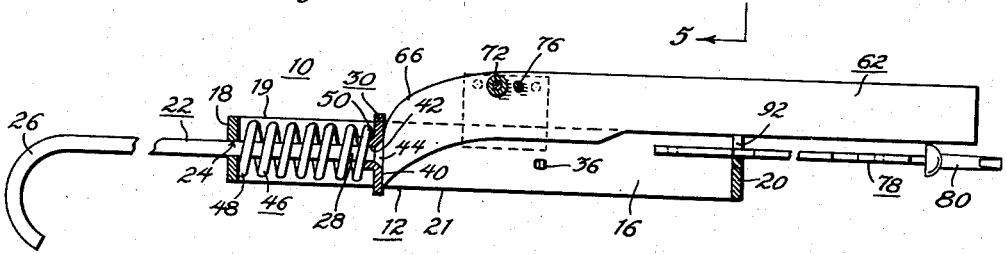
Figure 5:
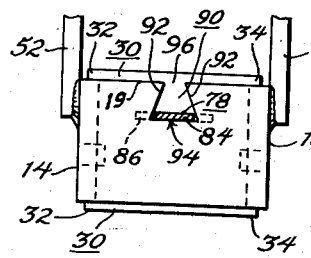

The above objects of the invention as well as many other objects will become apparent when the following description of the invention is read together with the drawings in which:

Figure 1 is a plan view illustrating an application of a number of securing devices embodying the invention for securing and positioning a body on a transporting platform, Figure 2 is a side elevational view of Figure 1, Figure 3 is an enlarged plan view of the securing device, Figure 4 is a side elevational view of the device shown in Figure 3, Figure 5 is a sectional view taken on the line 5—5 of Figure 4, and Figure 6 is a side elevational view of the device with portions broken away illustrating its inactive condition with the cam lever engaged.

Like reference numerals designate like parts throughout the several views.

Referring to the figures, the securing device 10 comprises an elongated frame unit 12 preferably made of a band of metallic material forming side portions 14, 16 and end portions 18, 20 with top and bottom edges 19 and 21.

A retractable securing rod element 22 is slidably received through an opening 24 in the end portion 18 of the frame unit 12. The extending end 26 of the retractable securing rod element 22 may be hooked, while its other ends 28 is swivel secured with a spring compressing plate 30.

The spring compressing plate 30 which is substantially rectangular in figuration is received between the side portions 14, 16 of the frame unit 12 and is retained for movement in the direction between the end portions 18, 20 of the frame unit 12 by the pairs of positioning flanges 32, 34. The side portions 14, 16 of the frame unit 12 are also provided with a pair of extensions 36 which engage the spring compressing plate 30 to limit its motion in the direction towards the end portion 20 of the frame unit 12.

The spring compressing plate 30 is provided with a spring contacting surface 38 on one side and a cam engaging surface 40 on the other. An opening 42 which passes through the spring compressing plate 30 is countersunk at the surface 40 (see Figure 6). This allows the end 28 of the securing rod 22, which passes through the opening 42 in the plate 30 and has a flattened head 44 received within the countersunk portion of the opening 42, to swivel engage same. This arrangement allows adjustment of the hook end 26 of the securing rod element 22 about its axis, and causes movement of element 22 along its axis with the sliding action of the spring compressing plate within the frame unit 12.

A heavy duty coil spring member 46 which tends to assume its fully expanded position, is received within the frame unit 12 about the retractable securing rod element 22. One end 48 of the spring element 46 contacts the end portion 18 of the frame unit 12, while its other end 50 engages the spring contact surface 38 of the spring compressing plate 30.

When the coil spring member 46 is in its fully extended position as shown in Figures 3 and 4, the spring compressing plate 30 assumes its terminal position engaging the extending portions 36 of the frame unit 12, thereby causing the maximum retraction of the securing element 22. As will be seen hereafter, the device 10 does not have its securing element 22 fully retracted when it is in operation securing and positioning a body. The securing element 22 of the device 10 may however assume its fully retracted position when it is stored or not applied.

A pair of lever supporting members 52 are connected with the frame unit 12 intermediate its end portions 18, 20 by having their bottom sections respectively secured (as by welding) with the side portions 14, 16 of the unit 12. The top parts of the supporting members 52 respectively extend from the top edge 19 of the side portions 14, 16 of the frame unit 12. The top portion of each supporting member 52 is provided with four pin-receiving openings 54, 56, 58 and 60.

A lever 62 which is pivotally secured with the supporting members 52 is provided with a handle portion 64, a cam portion 66 and a pair of laterally extending positioning portions 68 having an opening 70 through them (Figure 3). The lever 62 is pivotally secured with the supporting members 52 by means of a removable pivot pin 72 which extends through a pair of openings 54, 56, 58, 60 in the members 52 and the opening 70 in the lever 62. The pin 72 may be secured in position by cotter pin 73 or other suitable means.

Although the figures illustrate the lever 62 pivotally secured by the pin 72 passing through the pair of openings 56 of the support members 52, the pivot location of the lever 62 may be varied along the frame unit 12 between its end portions 18, 20 by positioning the pivot pin 72 through any selected pair of the other openings 54, 58 and 60.

The Figures 3 and 4 show the lever 62 with its cam portion 66 disengaged, while the Figure 6 illustrates the unit 10 with its lever 62 fully pivoted and its cam portion 66 contacting the cam engaging surface 40 of the spring compressing plate 30. The Figure 6 discloses the spring compressing plate 30 in its fully displaced position towards the end portion 18 of the frame unit 12. This results in the compression of the coil spring element 46 and the extension of the retractable securing rod element 22.

The securing device 10 is provided with means for locking the cam lever 62 when in its engaged position shown in Figure 6. This is accomplished by providing an opening 74 (Figure 3) in the cam lever 62 which may be aligned with a pair of openings 56, 58, 60 in the supporting members 52 for removably receiving a locking pin 76 (see Figure 6) when the lever 62 is in its engaged position. The device 10 may have its lever 62 locked in its engaged position preparatory to application, allowing its easier manipulation and handling during application.

The device 10 may also be provided with a second detachable securing element 78 which is an elongated flat member having a swivel hook 80 at one end and a plurality of notches 82 along its length forming narrow portions 84 and wide portions 86. The wide portions 86 may also be provided with openings 88 which also may serve for attaching purposes.

The securing element 78 is detachably connected with the end portion 20 of the frame unit 12. The end portion 20 is provided with a wedge or taper shaped opening 90 extending from the top edge 19 of the frame unit 12. The side portions 92 of the opening 90 diverge downwardly from the top surface 19 of the end portion 20 of the frame unit 12 and meet at a substantially horizontal bottom edge 94 which has a length greater than that of the entrance 96 of the opening 90.

The wide portion 86 of the securing element 78 has a width greater than the length of the opening of the bottom edge 94 of the opening 90 while its narrow portion 86 has a width less than the width of said base ledge 94 but wider than the dimensions of the entrance 96 of the opening 90.

To attach the securing element 78 to the frame unit 12, the narrow portion 84 is received within the opening 90 by passing through the entrance 96 edgewise. After passing through the entrance, the securing element 78 is turned to lie along the bottom ledge 94 of the opening 90 as clearly shown in Figure 5. By reversing this procedure, the securing element 78 is quickly detached from the frame unit 12.

The extent of the hook end 80 of the securing element 78 may be adjusted to some degree by the selection of the narrow portion 84 which is to be received within the opening 90 of the end portion 20 of the frame unit 12. Thus the hook 80 may be extended to a greater amount by selecting a narrow portion 84 of the securing element 78 which is more distant from the hook end 80. It is noted that although this limited adjustment may be of advantage in application of the device 10, the device 10 will also operate satisfactorily with a non-adjustable securing element 78 which is permanently attached to the frame unit 12.

The Figures 1 and 2 illustrate the application of the securing device 10 to a truck body 100 for securing and positioning it upon a platform 102 which is provided with brackets or connecting means 104. To illustrate the application of the devices 10 to the truck body 102, with the understanding that this is only one particular type of application of the device, the lever 62 is positioned with its cam portion 66 engaging the spring compressing plate 30, compressing the spring element 46 and extending the retractable securing element 26. The lever 62 may be locked in this position by the application of the locking pin 76. Each of the units to be applied may now be positioned with its securing element 26 attached with the respective rear and front bumpers 106, 108 or to any other suitable portion of the body 100. The second securing elements 78 of the devices 10 are respectively secured by engaging their hooks 80 with the brackets 104 through openings therein. The adjustment of extension provided by the narrow portions 84 of the securing element 78 takes care of any small variation in distance between the body to be secured 100 and the attaching brackets 104.

The locking pins 76 may now be removed and the levers 62 will assume their disengaged positions. This places each of the devices 10 in its active position. The tension applied by the spring element 46 to the spring compressing plate 30 is exerted upon the securing element 26 which tends to assume its retracted position. This tension which in effect is applied between the securing elements 26 and 78 of the devices 10 is transmitted to the body 100 along the respective longitudinal axes of the devices 10, thereby positioning and securing the body 100 on the platform 102. It is noted that the spring elements 46 of the units 10 also act as shock absorbers, thereby tending to minimize and prevent damage to the secured body 100.

It is also noted that the adjustment of the pivot location of the lever 62 along the length of the frame unit 12 determines the degree of extension of the retractable securing element 26 and the amount of compression of the spring element 46. This may be varied in accordance with the particular application so that the tension which is applied by the device 10 can be adjusted for maximum effect. Also if a minimum of spring tensioning is required, the positioning of the lever 62 for reduced amount of compression correspondingly reduces the effort required to engage the lever 62 and increases the ease of manipulating the device 10.

Although the device is shown directly connected between the secured body 100 and connecting brackets 104, it is evident that the device 10 may be secured as an intermediate element with cables, chains, or other connecting means.

The advantages of the device 10 in being rapidly and easily applied to secure a body and safely maintaining its position are readily evident. Furthermore, the use of the device 10 eliminates the need for turn buckles in applying the device and reduces the waste of connecting wires and cables which are usually severed for quickly detaching the secured body.

While this invention has been described and illustrated with reference to a specific bodiment and mode of application, it is to be understood that the invention is capable of various modifications and applications, not

What is claimed is:

1. A securing device comprising a frame unit with an extensible securing element slidably received therein, a contractible spring member for urging said element towards its retracted position, and cam means supported by said frame unit and engaging said element for contracting said spring member and inactivating said device.

2. A securing device comprising a frame unit with an extensible securing element slidably received therein, a contractible coil spring member for urging said element towards its retracted position, and a cam lever supported by said frame and engaging said element for controllably compressing said spring member and extending said securing element and inactivating said device.

3. A securing device comprising a frame unit with an extensible securing element, a spring compressing member movable within said frame and coupled with said securing element, a contractible spring member positioned between said frame unit and compressing member for urging said securing element toward its retracted position, and a cam lever pivotally secured with said frame unit controllably engaging said compressing member for compressing said spring member and extending said securing element to inactivate said device.

4. A securing device comprising a frame unit having first and second ends, a securing element extending from the first end of said unit, a spring compressing member coupled with said securing element and movable in the direction between the first and second ends of said unit, a contractible coil spring member received within said unit about said securing element and between said compressing member and the first end of said unit urging said securing element toward its retracted position, and a cam lever pivotally secured with said frame unit controllably engaging said compressing member to inactivate said device by compressing said spring member and extending said securing element.

5. A securing device comprising a frame unit having first and second ends, a securing element having a first end extending through the first end of said body and a second end, a spring compressing plate swivel connected with the second end of said securing element and movable in the direction between the first and second ends of said unit provided with a spring contacting surface and a cam engaging surface, a contractible coil spring member received within said body about said securing element and between said compressing plate and the first end of said unit urging said compressing plate toward the second end of said unit and said securing element toward its retracted position, and a cam level pivotally secured with said frame unit controllably contacting the cam engaging surface of said compressing plate to inactivate said device by movement of said plate toward the first end of said unit compressing said spring member and extending said securing element.

6. A securing device for coupling and positioning bodies comprising a frame unit having first and second ends, a first retractible securing element slidably received therein and extending from the first end of said unit, a second securing element attached to the second end of said frame unit, said first and second securing elements being respectively adapted for connecting with the bodies to be coupled and positioned, a load member urging said first element towards its retracted position, and cam means engaging said first element and counteracting said load member only when the device is inactive.

7. A securing device for coupling and positioning bodies comprising a frame unit having first and second ends, a first retractible securing element extending from the first end of said unit, a second securing element attached to the second end of said frame unit, said first and second securing elements being respectively adapted for connection with the bodies to be coupled and positioned, a spring compressing plate coupled with said first securing element and movable in the direction between the first and second ends of said frame unit, a contractible coil spring member received within said unit about said first securing element and between said compressing plate and the first end of said body urging said first securing element towards its retracted position, and a cam lever pivotally secured with said frame unit controllably engaging said plate for compressing said spring member and extending said first securing element when the device is inactive, said cam lever disengaging said compressing plate when the device is to actively couple and position said bodies.

8. A securing device for coupling and positioning bodies comprising a frame unit having first and second ends, a first retractible securing element having a first end extending through the first end of said unit and a second end, a second securing element removably attached to the second end of said frame unit, said first and second securing elements being respectively adapted for connection with the bodies to be coupled and positioned, a spring compressing plate coupled with the second end of said first securing element and movable in the direction between the first and second ends of said unit provided with a spring contacting surface and a cam engaging surface, a contractible coil spring member received within said unit about said first securing element and between said compressing plate and the first end of said unit urging said compressing plate toward the second end of said unit and said securing element toward its retracted position, and a cam lever pivotally secured with said frame unit controllably contacting said cam engaging surface of said compressing plate for movement of said plate towards the first end of said unit compressing said spring member and extending said first securing element when the device is inactive, said cam lever disengaging said compressing plate when the device is to actively couple and position said bodies.

9. A securing device for coupling and positioning bodies comprising a frame unit having first and second ends and top and bottom edges, the second end of said frame unit having a wedge shaped opening with a reduced entrance at its top edge, and a detachable securing element being a flat elongated member having a portion of reduced width which exceeds the entrance size of the opening of said frame unit and a thickness which is less than said entrance size, said member being removably received within the opening of said frame unit by being turned edgewise to pass through said entrance.

10. A securing device for coupling and positioning bodies comprising a frame unit having first and second ends and top and bottom edges, the second end of said frame unit having a wedge shaped opening extending from the top edge of the second end of said frame unit with a top entrance dimension less than its bottom dimension, and a securing element being a flat elongated member having a width greater than the bottom dimension of the opening of said frame unit and a portion of reduced width which exceeds the entrance dimension and is less than the bottom dimension of the opening of said frame unit, said securing element being detachably secured with said frame unit by positioning the reduced portion of the element within the opening of said unit, said element being turned edgewise to pass through the reduced entrance of the opening of said frame unit.

11. A securing device for coupling and positioning bodies comprising a frame unit having first and second ends and top and bottom edges, a first retractible spring loaded securing element extending from the first end of said body, the second end of said frame unit having a wedge shaped opening extending from the top edge of the second end of said frame unit with a top entrance dimension less than its bottom dimension, and a second securing element of flat elongated configuration having a width greater than the bottom dimension of the opening of said frame unit and a portion of reduced width which exceeds the entrance dimension and is less than the bottom dimension of the opening of said frame unit, said second securing element being detachably secured with said frame unit by positioning the reduced portion of the element within the opening of said unit, said second element being turned edgewise to pass through the reduced entrance of the opening of said frame unit.

12. A securing device for coupling and positioning bodies comprising a frame unit having first and second ends and top and bottom edges, a first securing element having a first end extending through the first end of said unit and a second end, a spring compressing plate coupled with the second end of said first securing element and movable in the direction between the first and second ends of said unit provided with a spring contacting surface and a cam engaging surface, a contractible coil spring member received within said unit about said first securing element and between said compressing plate and the first end of said unit urging said compressing plate toward the second end of said unit and said first securing element toward its retracted position, a cam lever pivotally secured with said frame unit controllably contacting the cam engaging surface of said compressing plate for movement of said plate toward the first end of said unit compressing said spring member and extending said first securing element, the second end of said frame unit having a wedge shaped opening extending from the top edge of the second end of said frame unit with a top entrance dimension less than its bottom dimension, and a second securing element of flat elongated configuration having a width greater than the bottom dimension of the opening of said frame unit and a portion of reduced width which exceeds the entrance dimension and is less than the bottom dimension of the opening of said frame unit, said second securing element being detachably secured with said frame unit by positioning the reduced portion of the second element within the opening of said unit, said second element being turned edgewise to pass through the reduced entrance of the opening of said frame unit.

13. A securing device comprising a frame unit with an extensible securing element slidably received therein, a contractible spring member urging said element toward its retracted position, and a lever pivotally secured with said frame unit and having a cam portion engaging said element and contracting said spring member when said device is inactive.

14. A securing device comprising a frame unit with an extensible securing element slidably received therein, a contractible spring member urging said element toward its retracted position, and a lever having a cam portion engaging said element and contracting said spring member when said device is inactive, said frame unit being provided with means for pivotally and selectively securing said lever at any one of a plurality of positions along said frame unit for determining the amount of contraction of said spring member afforded by said lever.

15. A securing device comprising a frame unit with an extensible securing element provided with a plurality of pairs of pivot openings at predetermined positions, a spring compressing member movable within said frame unit and coupled with said securing element, a contractible spring member positioned between said frame unit and compressing member for urging said securing element toward its retracted position, a lever having a cam portion controllably engaging said compressing member compressing said spring member and extending said securing element when said device is inactive, and a pin element pivotally securing said lever with said frame unit by selectively engaging any pair of said pivot openings for determining and adjusting the amount of contraction of said spring member and the amount of extension of said securing element afforded by action of said lever.

16. A securing device comprising a frame unit having first and second ends, a securing element having a first end extending through the first end of said unit and a second end, a spring compressing plate coupled with the second end of said securing element and movable in the direction between the first and second ends of said unit provided with a spring contacting surface and a cam engaging surface, a contractible coil spring member received within said unit about said securing element and between said compressing plate and the first end of said unit urging said compressing plate toward the second end of said unit and said securing element toward its retracted position, a lever having a cam portion controllably contacting the cam engaging surface of said compressing plate for movement of said plate toward the first end of said unit compressing said spring member and extending said securing element when said device is inactive, a removable pin element pivotally securing said lever with said frame unit at any one of a predetermined plurality of locations along said unit for determining and adjusting the amount of contraction of said spring member and the amount of extension of said securing element afforded by action of said lever, and means for controllably locking said lever with its cam portion contacting the cam engaging surface of said compressing plate and extending said securing element.

17. A securing device for coupling and positioning bodies comprising a frame unit having first and second ends and top and bottom edges, a first securing element having a first end extending through the first end of said unit and a second end, a spring compressing plate coupled with the second end of said first securing element and movable in the direction between first and second ends of said unit provided with a spring contacting surface and a cam engaging surface, a contractible coil spring member received within said unit about said first securing element and between said compressing plate and the first end of said unit urging said compressing plate toward the second end of said unit and said first securing element toward its retracted position, a lever having a cam portion controllably contacting the cam engaging surface of said compressing plate for movement of said plate toward the first end of said unit compressing said spring member and extending said securing element when said device is inactive, a removable pin element pivotally joining said lever unit with said frame unit at any one of a predetermined plurality of locations along said unit for determining and adjusting the amount of contraction of said spring member and the amount of extension of said securing element afforded by action of said lever, the second end of said frame unit having a wedge shaped opening extending from the top edge of the second end of said frame unit with a top entrance dimension less than its bottom dimension, and a second securing element of flat elongated configuration having a width greater than the bottom dimension of the opening of said frame unit and a portion of reduced width which exceeds the entrance dimension and is less than the bottom dimension of the opening of said frame unit, said second securing element being detachably secured with said frame unit by positioning the reduced portion of said second securing element within the opening of said unit, said second element being turned edgewise to pass through the reduced entrance of the opening of said frame unit.

References Cited in the file of this patent

UNITED STATES PATENTS

| | | |
|---|---|---|
| 830,220 | Gibson | Sept. 4, 1906 |
| 1,232,554 | Jannelle | July 10, 1917 |
| 2,094,407 | Nampa | Sept. 28, 1937 |
| 2,128,667 | Atherton | Aug. 30, 1938 |